United States Patent
Segawa

(10) Patent No.: US 6,275,307 B1
(45) Date of Patent: Aug. 14, 2001

(54) IMAGE READ APPARATUS

(75) Inventor: Satoshi Segawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/088,585

(22) Filed: Jun. 2, 1998

(30) Foreign Application Priority Data

Jun. 2, 1997 (JP) .................................... 9-144095

(51) Int. Cl.[7] .............................. H04N 1/40; H04N 1/04
(52) U.S. Cl. ........................ 358/446; 358/475; 358/497
(58) Field of Search .................................. 358/474, 475, 358/446, 445, 479, 497, 494; 250/214 A, 214 AG, 208.1; 348/229, 221, 226, 362

(56) References Cited

U.S. PATENT DOCUMENTS

| | | | |
|---|---|---|---|
| 4,084,188 | * | 4/1978 | Gorog et al. ........................ 358/479 |
| 4,633,075 | * | 12/1986 | Sakai et al. ........................ 250/201 |
| 4,639,781 | * | 1/1987 | Rucci et al. ........................ 358/446 |
| 5,065,248 | * | 11/1991 | Homma ............................... 358/228 |
| 5,233,428 | * | 8/1993 | Alford et al. .................. 358/213.19 |
| 5,283,635 | * | 2/1994 | Suzuki et al. ....................... 358/516 |
| 5,625,183 | * | 4/1997 | Kashitani et al. .................. 250/236 |
| 5,877,810 | * | 3/1999 | Inuiya et al. ....................... 348/362 |

FOREIGN PATENT DOCUMENTS

| | | |
|---|---|---|
| 1-19311 | 4/1989 | (JP) . |
| 1-246971 | 10/1989 | (JP) . |
| 2-149068 | 6/1990 | (JP) . |
| 2-235483 | 9/1990 | (JP) . |
| 4-6951 | 1/1992 | (JP) . |
| 6-325194 | 11/1994 | (JP) . |
| 7-203286 | 8/1995 | (JP) . |
| 7-298129 | 11/1995 | (JP) . |
| 7-336586 | 12/1995 | (JP) . |
| 8-9102 | 1/1996 | (JP) . |
| 9-153988 | 6/1997 | (JP) . |

* cited by examiner

*Primary Examiner*—Cheukfan Lee
(74) *Attorney, Agent, or Firm*—Scully, Scott, Murphy & Presser

(57) ABSTRACT

An image read apparatus which is capable of implementing two-dimensional image reading with high resolution and high picture quality by using a linear image sensor. A vertical scanning mechanism inputs light imaged by a lens from a required sub-image of the read manuscript to a linear image sensor successively, before a sample and hold circuit samples part of an image signal outputted from the linear image sensor. An amplification factor control circuit changes an amplification factor which amplifies or attenuates the image signal in answer to a negative feedback input signal outputted from the sample and hold circuit. The change of the amplification factor causes the light component of the two-dimensional image signal other than the image to be removed due to a change of the amplification factor to be read. Thus, the sampled part of the image signal from the linear image sensor causes the amplification factor of the image signal to be subjected to the negative feedback. The negative feedback essentially removes or minimizes negative influences which affect the image signal caused by light-and-shade change of the frequency corresponding to the lamp line. The image read apparatus is consequently capable of implementing correction without reference to exposed time of the linear image sensor.

4 Claims, 10 Drawing Sheets

F I G. 5
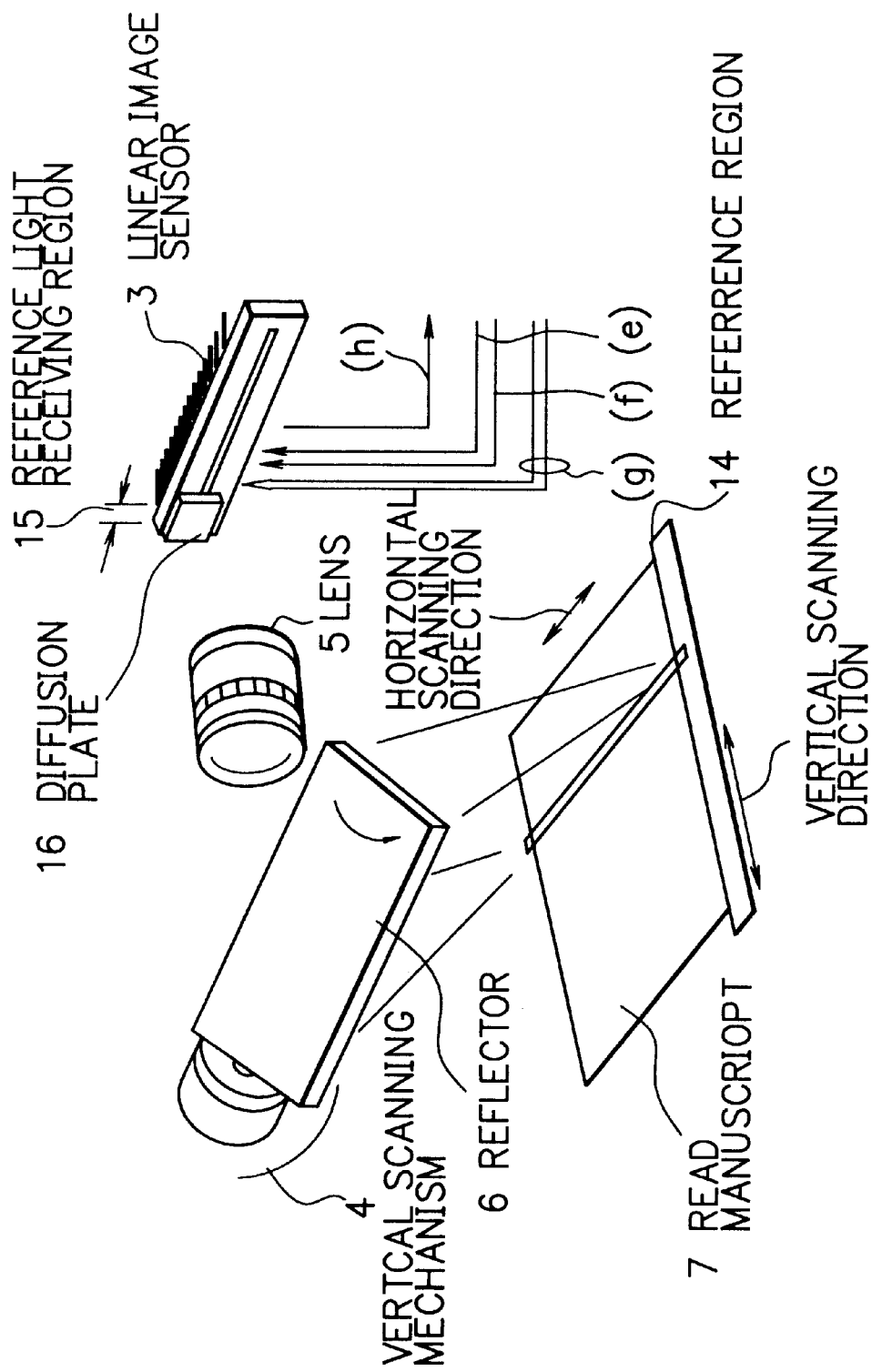

F I G. 7
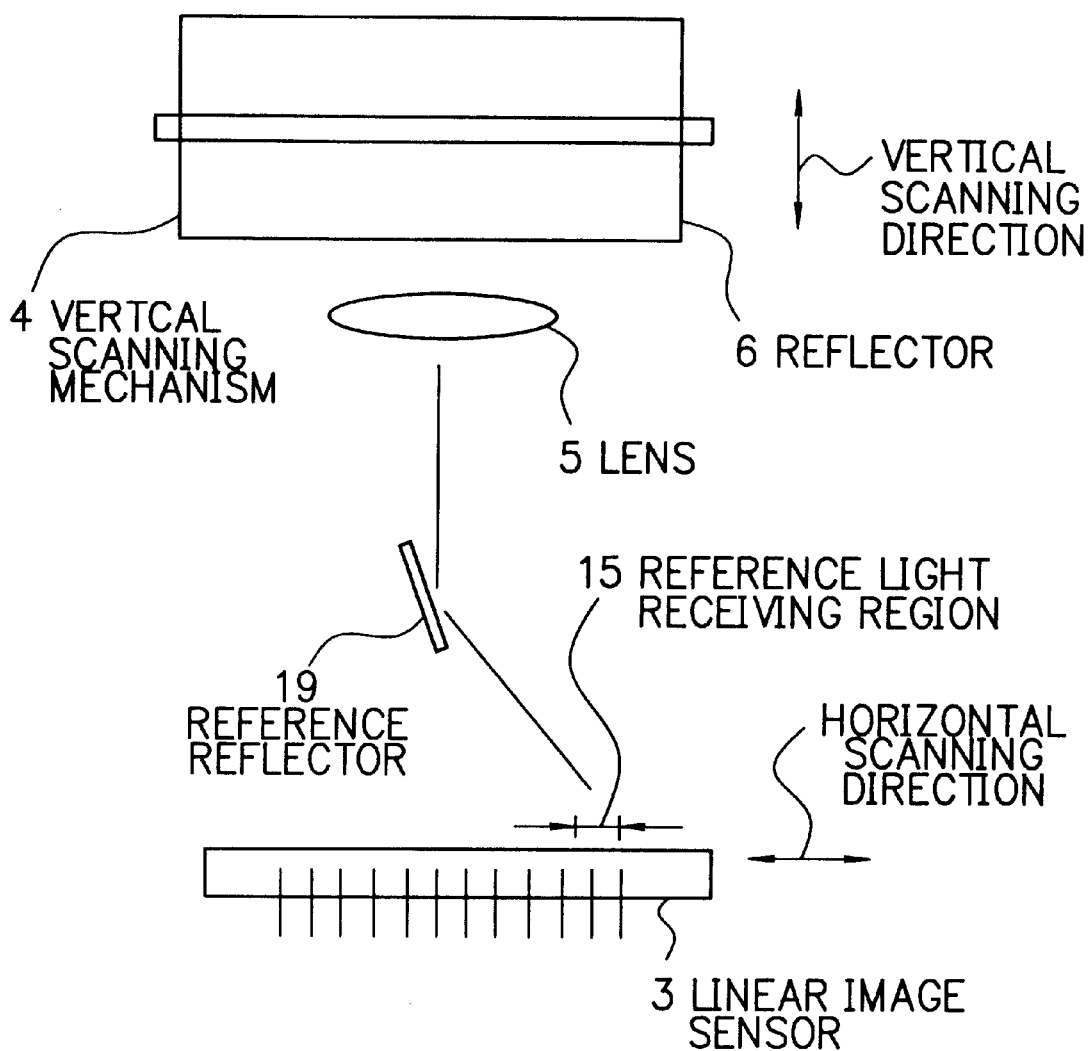

IMAGE READ APPARATUS

BACKGROUND OF THE INVENTION

The present invention relates to an image read apparatus for converting characters or images into read digital data. More particularly, this invention relates to an image read apparatus consisting of a linear image sensor and a vertical scanning mechanism, enabling two-dimensional image to be obtained while synthesizing sub-images.

DESCRIPTION OF THE PRIOR ART

Formerly, an image read apparatus is generally constituted by way of a read apparatus of the two-dimensional image data. A two-dimensional image sensor or a linear image sensor is in use for the image read apparatus by way of an image read sensor.

A general two-dimensional image sensor has on the order of three hundreds of thousands to eight hundreds of thousands of pixels. In contrast thereto, the image which is read by a linear image sensor has more than two thousand×3000 pixels. Consequently, the number of pixels of the two-dimensional image sensor is lower than that of the linear image sensor, with the result that there is the problem that resolution of the two-dimensional image sensor is insufficient.

When the linear image sensor is in use as by way of image-electric signal conversion element, an image read apparatus which reads in a two-dimensional image is constituted, while combining the linear image sensor with operation of vertical scanning. The image read apparatus of this constitution is separated into three kinds of types such as a flat bed type causing a box type apparatus to turn manuscript side to read in, a hand-held type in which the user implements vertical scanning by moving the device on the manuscript, or an indirect type image scanner in which the manuscript face is away from a read unit provided with a linear image sensor.

By way of examples, of indirect type image scanner whose read unit is separated from the manuscript surface, one is Form [DS-3000] made by CHINON INDUSTRIES INC. the other is a trademark [OOBAN SOKUSHA] made by Casio Computer, Co., Ltd. In the case of the image scanner which reads an image data in an indirect type manner, brightness should be supplied by a ceiling light, natural light, or an auxiliary light source. In the image scanner devices of both CHINON INDUSTRIES INC. and Casio Computer, Co., Ltd. the light is supplied by only the ceiling light instead of an auxiliary light source.

By way of example of the indirect type image scanner using an exclusive auxiliary light source, there is the "image read apparatus" of Japanese Patent Application Laid-Open No. HEI 06-137035 of the conventional example 1. In conventional example 1, an image scanner unit is combined with a table lamp so that brightness is supplied with the table lamp as the exclusive auxiliary light source. However, in the indirect type image scanner, regardless of the auxiliary light source used, it is normal that light of a ceiling lamp is deflected into the scanner unless the ceiling lamp light is shaded. As reading time makes high speed, flicker of the lamp line AC flowing into the ceiling lamp causes the generation of stripe lines in the line direction of the linear image sensor, thus affecting the read image.

By way of method for reducing bad influence according to the above described ceiling light, "image read apparatus" of the Japanese Patent Application Laid-Open No. HEI 07-308748 of the convention example 2 proposes method for implementing correction to the image. In this method, variation of brightness of the ceiling lamp caused by lamp line AC is taken out by way of output signal. There is provided a different optical sensor from the linear image sensor, which optical sensor causes the above described output signal to invert to add to the image signal.

Further, the Japanese Patent Application Laid-Open No. HEI 07-336586 discloses a method for removing the influence of the flicker. In this method, a signal detected due to an illumination light detecting means of the light source is analyzed, before setting exposed time corresponding to frequency component to a line sensor, so that the influence of the flicker is removed.

Furthermore, by way of the method for removing variation component followed by brightness variation among the image signal instead of provision of another sensor, "image information processing apparatus" of the Japanese Patent Publication No. HEI 01-19311 by Canon Inc. is disclosed by way of the conventional example 4. In example 4 a prescribed width in the direction of vertical scanning is read while moving a light receiving element group (semi-multi sensor) arranged in such a way that several ten pixels are arranged in the vertical scanning direction and in the horizontal scanning direction. The manuscript being scanned is then shifted in the vertical scanning direction of width corresponding to the read width, again the semi-multi sensor is moved in the horizontal scanning direction repeatedly. This method enables a manuscript of two-dimensions to be read.

With respect to removing a variation component accompanying a brightness variation, there is provided a reference member for quantity of light in front of the manuscript image, causing the image of the reference member to read to the part of pixel among a plurality of pixels of the semi-multi sensors, thus obtaining illuminating information by using a peak hold circuit. An automatic gain control circuit (AGC) causes correction to the image signal such that first illuminating information agrees with the following illuminating information. Alternatively, there is provided a switch to switch signal outputting period of the illuminating information to the period of image signal, thus implementing correction to the image signal by means of a comparator.

In "line sensor camera" disclosed in the Japanese Patent Application No. HEI 07-203286 by Hitachi Denshi, Co., Ltd. by way of the conventional example 5, a line image sensor is used as an image pick-up device, and a part of the line image sensor is directly used as a sensor for detecting flicker. The outputted signal for detecting flicker is subjected to sample-hold to be inverted, before being added to an amplification circuit of the image signal, thus implementing an inverse correction.

In "imaging device" of the Japanese Patent Application No. HEI 06-325194 by DENSO CORPORATION LTD. by way of the conventional example 6, the imaging device divides pulsating cycle of illumination into a plurality of cycles, thus accumulating light received electric charges corresponding to the numbers of division, before outputting by way of the image signal, so that pulsating variation of the illumination is absorbed. By way of example in which addition of electric charge instead of accumulation of electric charge causes a plurality of imaging result to be processed, "imaging device" is disclosed in the Japanese Patent Application Laid-Open No. HEI 07-298129 by Canon Inc. by way of the conventional example 7. The imaging device causes the flicker component of the light source to be removed by adjusting the plurality of imaging results while combining the adder with the delay circuit in terms of the image signal.

The above-described respective conventional examples are the examples in which light receiving elements by way of imaging element are disposed in line configuration (i.e., one-dimension). However, in the image input apparatus using two-dimensional image sensor (area CCD) in which light receiving elements are disposed in two-dimensional configuration, flicker to be variation of light of disturbance is a problem. By way of method for resolving the problems, the Japanese Patent Application Laid-Open No. HEI 08-246971 of the conventional example 8 discloses "luminous exposure control method of imaging device" which causes exposed time to determine such that imaging reference cycles comes into the least common multiple of light-emitting cycle, or the imaging reference cycle comes into integer number times of cycle, so that is enables flicker generated due to brightness cycle of the light source to be removed. Further, in the "image processing apparatus" of the Japanese Patent Application Laid-Open No. HEI 02-235483 by way of the conventional example, it causes the correction to be implemented while estimating variation component of quantity of light to be a cause of the flicker from AC cycle provided to power source.

However, in the above-described respective conventional examples, the ceiling lamp is driven by alternating current (AC of 50 Hz to 60 Hz) supplied by electric power company, with the result that in the case of fluorescent lamp brightness thereof varies with frequency corresponding to the AC. When accumulating time by the linear image sensor approximately equals AC cycle (in East side of Japan approximately 10 ms), few bad influence caused by stripe line occurs, however as accumulating time comes into short from the AC cycle, dark-and-light appears in the read image with several lines of the linear image sensor as cycles, so that bad influence caused by the ceiling lamp is ascertained remarkably.

For this reason, the conventional apparatus according to CHINON INDUSTRIES INC. and Casio Computer Co., Ltd. read the manuscript while smoothing flush of the ceiling lamp with sufficient read time (20 seconds to 40 seconds). For example, with respect to the read time, accumulated time in every one line of the linear image sensor is necessary to exceed 10 ms. When more than 2000 lines every one piece of image is required, more than 20 seconds are needed. Consequently, it is difficult to quickly read manuscript.

Further, the Japanese Patent Application Laid-Open No. HEI 07-308748 proposes the method for correcting image while providing the optical sensor for detecting time variation about the brightness of the ceiling lamp. However, there is difference of sensitivity between the optical sensor for correction which detects time variation of the brightness of the ceiling lamp and the linear image sensor which reads the image. For this reason, it is necessary to adjust level and amplitude of brightness variation component which correcting optical sensor receives light, to the brightness variation component of the ceiling lamp which the linear image sensor reads with the image. There is difference between the flicker correcting optical sensor and the linear image sensor not only regarding sensitivity of the brightness but also spectral sensitivity.

Namely, respective sensors respond to different wave length peak, with the result that bad influence of the ceiling lamp inputted by the linear image sensor is not reduced correctly. Further linearity concerning sensitivity between the linear image sensor and the correcting sensor is not necessarily identical with each other. For this reason, gradation image with different reflection factor, namely, in the gray image, difference of output from the respective sensors occurs in relation to intermediate density. It becomes difficult to insure optimum amount of correction according to several densities, resulting in appearance of horizontal stripe lines.

In the "imaging device" of the Japanese Patent Application Laid-Open No. HEI 07-336586 of the conventional example 3, since it causes exposed time of the linear image sensor to be determined due to the result of analysis of the frequency component while detecting illumination light, the exposed time is subjected to the restriction due to illumination light. For this reason, even if the linear image sensor is intended to be driven in high speed, since there is restriction that exposed time is difficult to be shortened, there is the problem that read time is difficult to be sped up similar to the example of above CHINON INDUSTRIES INC. or Casio Computer Co., Ltd.

The semi-multi sensor is in use for the imaging element as disclosed in the "image information processing apparatus" of the Japanese Patent Application Laid-Open No. HEI 01-19311 by way of the conventional example 4. The image information processing apparatus causes the semi-multi sensor mounted in parallel to the vertical scanning direction to move in the horizontal scanning direction for reading two-dimensional manuscript, further performing the horizontal scanning once by shifting the manuscript in the direction of vertical scanning. Since the apparatus reads the two-dimensional manuscript due to repeating this operation, not only time is required for reading one piece of the manuscript but also the apparatus becomes complicated because movable sections of both of horizontal scanning and vertical scanning increase in number. It is necessary to move the reference member for correcting flicker together with the vertical scanning so that the apparatus becomes more complicated. At the time determining illumination information, the peak hold circuit is used, therefore when the illumination information of the reference member in the start of horizontal scanning flickers, the maximum illumination of the flicker on that occasion is set unavoidably as reference brightness of the whole horizontal scanning. For this reason, when the maximum illumination of the reference member has the flicker, it causes noise so that it affects reference brightness, resulting in stripe lines in every horizontal scanning, being in danger of deterioration of image quality.

In "line sensor camera" disclosed in the Japanese Patent Application Laid-Open No. HEI 07-203286 of the conventional example 5, since a part of the line image sensor is directly utilized as flicker correction means, when the object or the image with difference of dark-and-light density is put on the manuscript surface which is imaged to the pixels on the line image sensor which is in use for flicker correction, these are erroneously detected by way of variation component of the flicker, bad influence is affected not only at the part of the flicker correction but also whole lines. Furthermore, with regard to the signal processing, the flicker detection signal is subjected to sample-hold before inverting the signal to add it to the image signal, however, the flicker phenomena occurs due to strength of the light source itself, and the light is reflected by the manuscript image, it works on the image signal with rate of reflection. For this reason, even if the flicker signal is intended to be added for correction due to inverting and adding in relation to the image signal, flicker correction is not implemented appropriately to manuscript image with various density (intermediate color) with the exception of manuscript image having the same density as the brightness corresponding to the pixel for correcting flicker.

In the "imaging device" disclosed in the Japanese Patent Application Laid-Open No. HEI 06-325194 of the conventional example 6 and the "imaging device" disclosed in the Japanese Patent Application Laid-Open No. HEI 07-298129 of the conventional example 7, the image signal being subjected to the photoelectric conversion by the linear image sensor is superimposed with a plurality of times so that bad influence caused by flicker of the light source is removed. In these apparatus it is necessary to image by means of the linear image sensor by a plurality of times, and timing thereof is determined due to flicker cycle of the light source, thereby the time for obtaining the image in every one line is restricted so that when reading image with high speed, limit occurs caused by flicker cycle of the light source.

Furthermore, the Japanese Patent Application Laid-Open No. HEI 01-246971 of the conventional example 8 and the Japanese Patent Application Laid-Open No. HEI 02-235483 of the conventional example 9 disclose examples in which a two-dimensional image sensor is in use therein instead of the linear image sensor. The two-dimensional image sensor is capable of reading the image in every one piece of the manuscript at high speed such as in a range of 1/30 to 1/600 second. Since reading time for one piece of the manuscript is short, method for avoiding bad influence caused by the flicker of the light source is difference therefrom. For example, in the Japanese Patent Application Laid-Open No. HEI 01-246971 of the conventional example 8, the exposed time is determined corresponding to the flicker cycle of the light source, however, in the two-dimensional image sensor, there is no problem because reading of one piece of the manuscript is implemented simultaneously. In the Japanese Patent Application Laid-Open No. HEI 02-235483 of the conventional example 9, the flicker cycle of the light source is calculated from the AC power source to perform correction. Since the light receiving element is arranged in two-dimensional configuration, order for taking data from the light receiving elements and calculation of correction value corresponding thereto are schemed.

SUMMARY OF THE INVENTION

In view of the foregoing, it is an object of the present invention to provide a two-dimensional image read apparatus which is capable of reading an image with high resolution and quality.

In one arrangement to be described below by way of example in illustration of the invention, an image read apparatus, which consists of a linear image sensor and vertical scanning mechanism, enables two-dimensional images to be obtained while synthesizing sub-images, includes a linear image sensor for converting light from an image into an image signal which is an electric signal, a lens for imaging the light of a read-image, a vertical scanning mechanism for inputting the light from a required sub-image from the image to the linear image sensor successively, a sample hold circuit for taking a part out of an image signal outputted from the linear image sensor, and an amplification factor control circuit for changing an amplification factor which amplifies or dumps the image signal in answer to a negative feedback input signal outputted from the sample hold circuit, wherein the image read apparatus causes a two-dimensional image signal whose primary factor without the image is removed to be read due to change of the amplification factor.

In one particular arrangement to be described in illustration of the present invention, by way of example, there is provided a diffusion plate and/or a reflector for reference at least at a part in front of a light receiving surface of the linear image sensor.

In another arrangement to be described below by way of example in illustration of the present invention, there is provided a filter for correcting flicker in between the sample hold circuit and the amplification factor control circuit.

In yet another arrangement to be described below by way of example in illustration of the present invention, the filter is either a low pass filter or a band pass filter.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 5 is a perspective view showing a second embodiment of an image read apparatus of the present invention;

FIG. 7 is a diagram providing a more detailed view showing the third embodiment;

DETAILED DESCRIPTION OF THE PREFERRED EMBODIMENTS

A preferred embodiment of an image read apparatus of the present invention will now be described in detail referring to the accompanying drawings. Referring to FIGS. 1 to 10, one embodiment of the image read apparatus of the present invention is shown.

Figure 1:
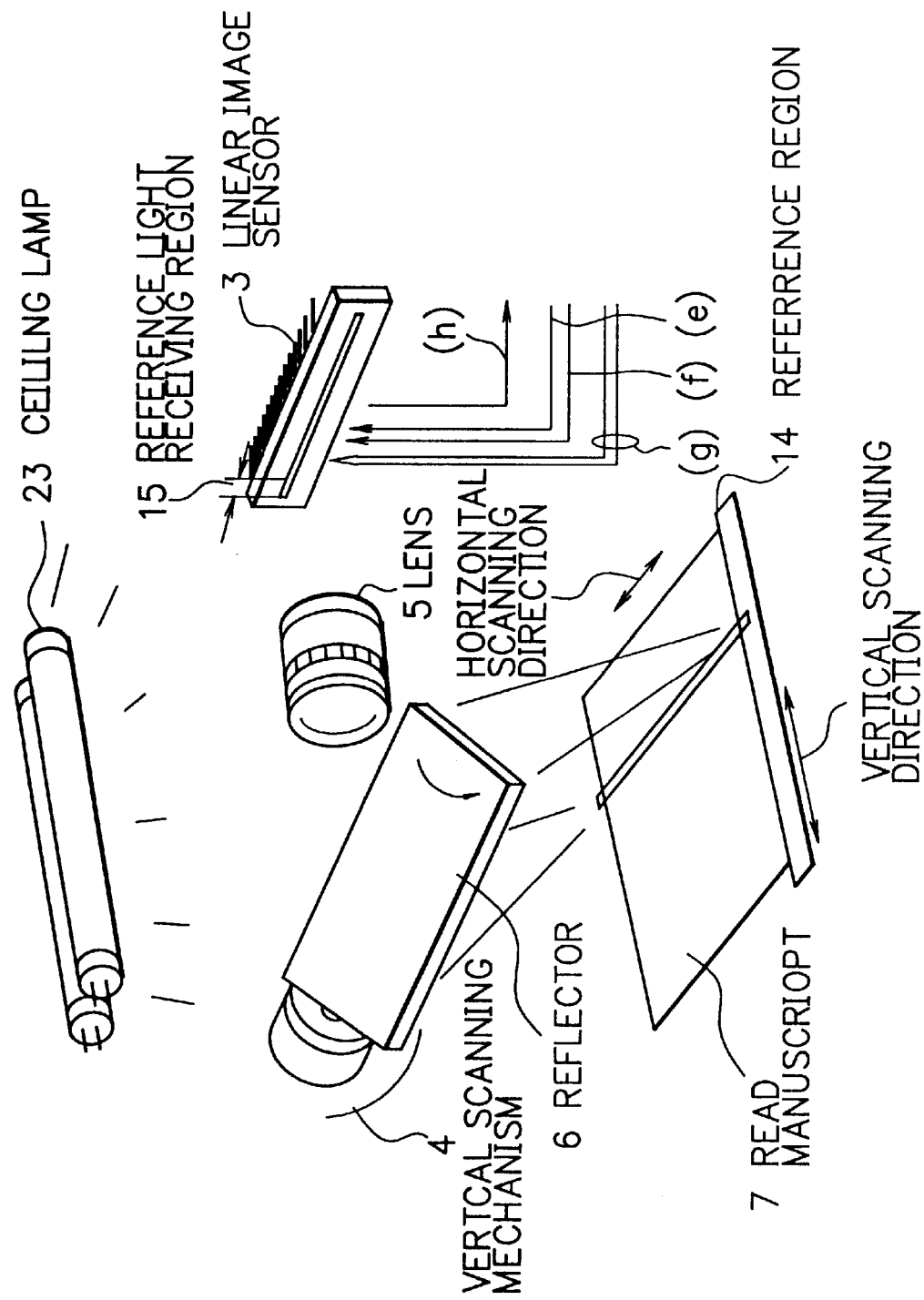
FIG. 1 is a perspective view showing a first embodiment of an image read apparatus of the present invention.
Figure 2:
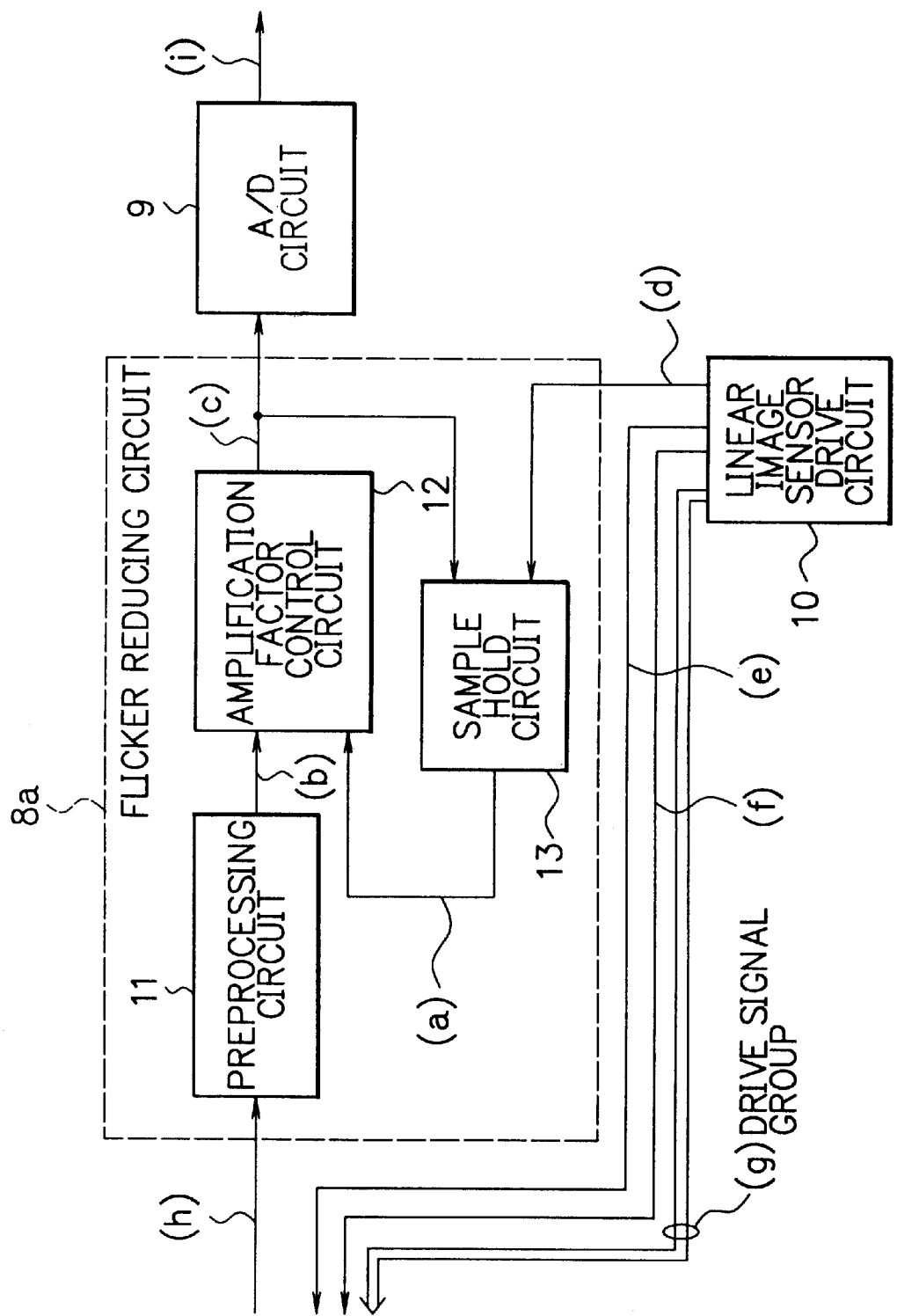
FIG. 2 is a block diagram showing a circuit constitution of the first embodiment.

FIGS. 1 and 2 show configuration examples of a first embodiment of the image read apparatus of the present invention. The image read apparatus of the first embodiment comprises a linear image sensor 3 for converting an image into an electric signal, a lens 5 for imaging an image of the read-image on the image sensor, a vertical scanning mechanism 4 for the inputting sub-image in the required direction to the linear image sensor 3 in order, a flicker reducing circuit 8a connected to the linear image sensor 3 by means of a connection line h, an A/D conversion circuit 9 for converting an output from the flicker reducing circuit 8a into a digital data, a linear image sensor drive circuit 10 which inputs to drive a clock signal to the linear image sensor 3.

In the present invention, it is mainly described with respect to an indirect type image scanner in which a read unit consisting of a linear image sensor, a vertical scanning mechanism and a lens for imaging are kept apart from a manuscript-image which is read. An image scanner with refraction optical system has a bent optical path from a manuscript-image to a linear image sensor following miniaturization of apparatus or forming apparatus thinner. In this image scanner with refraction optical system, when there exists a flicker component within a light source which is irradiated to a manuscript-image, it is capable of applying this constitution of the present invention thereto. In the indirect type image scanner, an image reading mechanism consisting of a linear image sensor and a vertical scanning mechanism is kept apart from a read manuscript, and light of a ceiling lamp is reflected on the manuscript face with the result that the light and the image are read therein. The ceiling lamp 23 described in FIGS. 1 and 2, is not necessary constitutional element for the present invention, however in these drawings, the state of affairs that light source of a general ceiling lamp arrives at manuscript face is shown.

As shown in FIGS. 1 and 2, the vertical scanning mechanism of the image read apparatus is provided with a reflector 6 for reflecting sub-image of the read-image in the required direction and a vertical scanning mechanism 4 for rotating the reflector 6. According to the present configuration, there are a plurality of methods for vertical scanning. The vertical scanning is implemented such that rotation of the reflector 6 causes required sub-image to be projected on the linear image sensor 3. Another vertical scanning is implemented such that translation (no rotation) of the reflector 6 causes sub-image in the required direction to be projected on the linear image sensor 3 in order. Still another vertical scanning is implemented such that the linear image sensor itself shifts on the surface where the image is imaged due to the lens instead of the reflector, thus reading in sub-image in order. As described above, if the constitution is that combination of the linear image sensor with the vertical scanning mechanism causes the manuscript-image to be read in the two-dimensional image, it is capable of being used by way of vertical scanning mechanism of the present invention.

The linear image sensor is some times called a one dimensional image sensor, a line image sensor, a line CCD, or a linear CCD. These can be used by way of the linear image sensor of the present invention, because light receiving elements are disposed in one-dimension, and possess the function that translation in one direction enables a two-dimensional image (including three dimensional object permitted in depth of focus) to be read. In the linear image sensor, pixel is constituted by optical semiconductor such as phototransistor or photodiode which is disposed in line state. Light is irradiated to this optical semiconductor to perform photoelectric conversion. The linear image sensor accumulates largeness of electric charge corresponding to light intensity during prescribed period (hereinafter referring to storage time). while implementing photoelectric conversion. A trigger signal with constant interval in every line causes the accumulated electric charges to be displaced to a register corresponding to respective pixels, before causing the accumulated electric charges to be transported to next register while synchronizing with transmission clock signal, thus electric charge accumulated in respective pixels is transmitted successively so that signal corresponding to line of the pixels is outputted in accordance with the lapse of time. Thus, during the same storage time, the electric charges are accumulated in respective pixels which fall within the light receiving surface, in answer to brightness of the manuscript image simultaneously, and brightness variation corresponding to each pixel is represented by an electric signal which changes in accordance with time caused by successive transmission of the electric charge, resulting in output of the required image signal.

Figure 4:
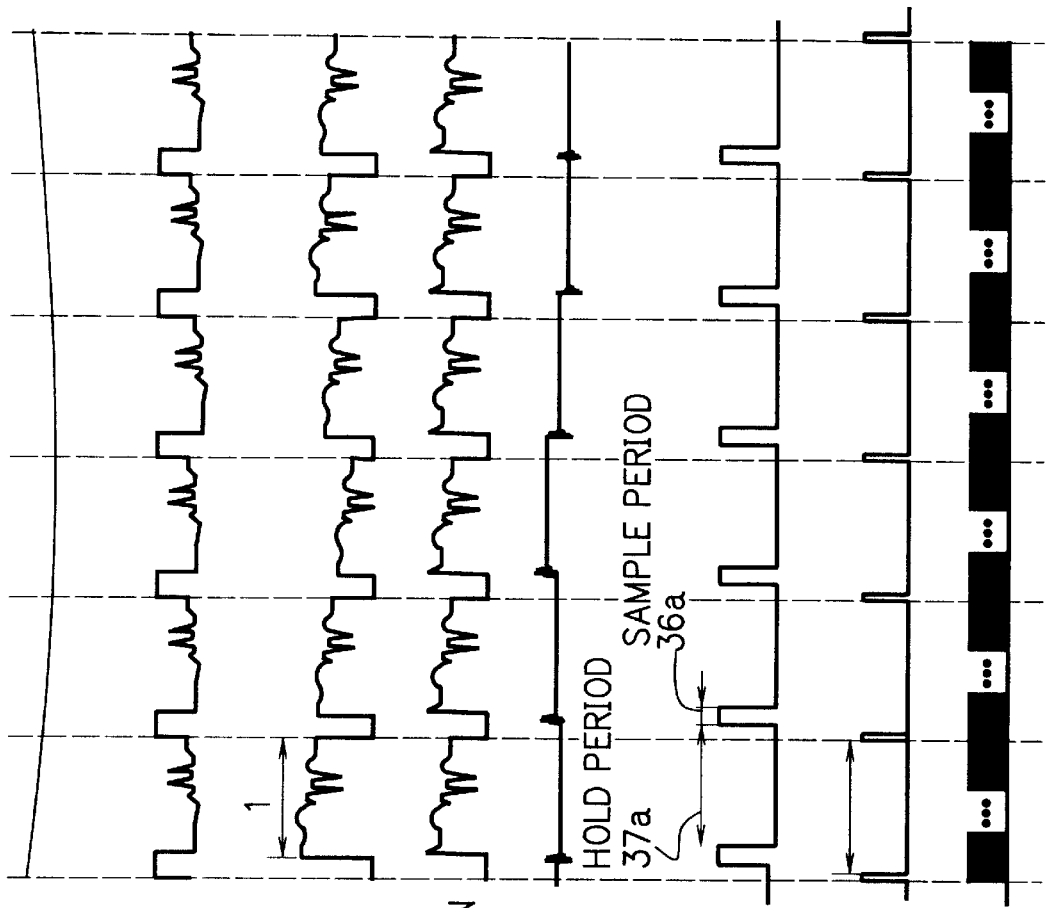
FIG. 4 is a timing diagram showing timing relationship of respective signals of the first embodiment.

The present invention is characterized by one constitutional element of the flicker reducing circuit 8a shown in FIG. 2. The flicker reducing circuit 8a comprises a preprocessing circuit 11, an amplification factor control circuit 12, and a sample and hold circuit 13. Examples of shape of signals which are inputted or outputted from respective blocks of FIG. 2 are shown in FIG. 4. An offset of an output signal (h) from the linear image sensor, an output-after-correction (b) which is an analog signal being subjected to an inverting amplification to be passed through the preprocessing circuit 11 for coordinating gain, and a negative feedback signal (a) for controlling the amplification factor are inputted to the amplification factor control circuit 12. An output-after-correction (c) from the amplification factor control circuit 12 is inputted to an A/D conversion circuit 9, and a part thereof is also inputted to the sample and hold circuit 13. The sample and hold circuit 13 is provided with a sample hold control signal (d) for controlling a term for sampling and a term for holding from the linear image sensor drive circuit 10.

The sample and hold circuit 13 causes a pixel of a reference light receiving region 15 to be sampled and holds the sampled value during a time prescribed by the term for holding. The pixel of the reference light receiving region 15 among the preprocessing output (b) of the signal passed through the preprocessing circuit outputted from the linear image sensor, namely, the signal of preprocessing output is sampled. The feedback signal (a) from the sample and hold circuit 13 is inputted to the amplification factor control circuit 12 of the flicker reducing circuit 8a by way of control signal. Consequently, within the period for sampling, the sample and hold circuit 13 constitutes a negative feedback circuit with the image signal as the input, with the processed signal as the output, and with the amplification factor as the control amount. The sample and hold circuit 13 causes the amplification factor established within the period for sampling to be held to control the image signal within the period for holding.

By way of one example of adjustment of the preprocessing circuit 11, when black is read by the linear image sensor, offset is adjusted such that a signal of the preprocessing output b from the preprocessing circuit 11 becomes approximately identical with a signal outputted when "0" of the feedback signal (a) is inputted to the amplification factor control circuit 12 by way of control signal. Further, when white is read in the linear image sensor, gain is adjusted such that a signal obtained from the linear image sensor becomes approximately identical with a signal outputted when a maximum level of the feedback signal (a) is inputted to the amplification factor control circuit 12 by way of control signal. Namely, "0" point thereof is adjusted such that an output-after-correction (c) of the amplification factor control circuit 12 when an amplification factor is "0" and an output-after-correction (c) of the amplification factor control circuit 12 when an image signal is black level are identical with each other. The maximum level thereof is adjusted to white level.

Figure 3:
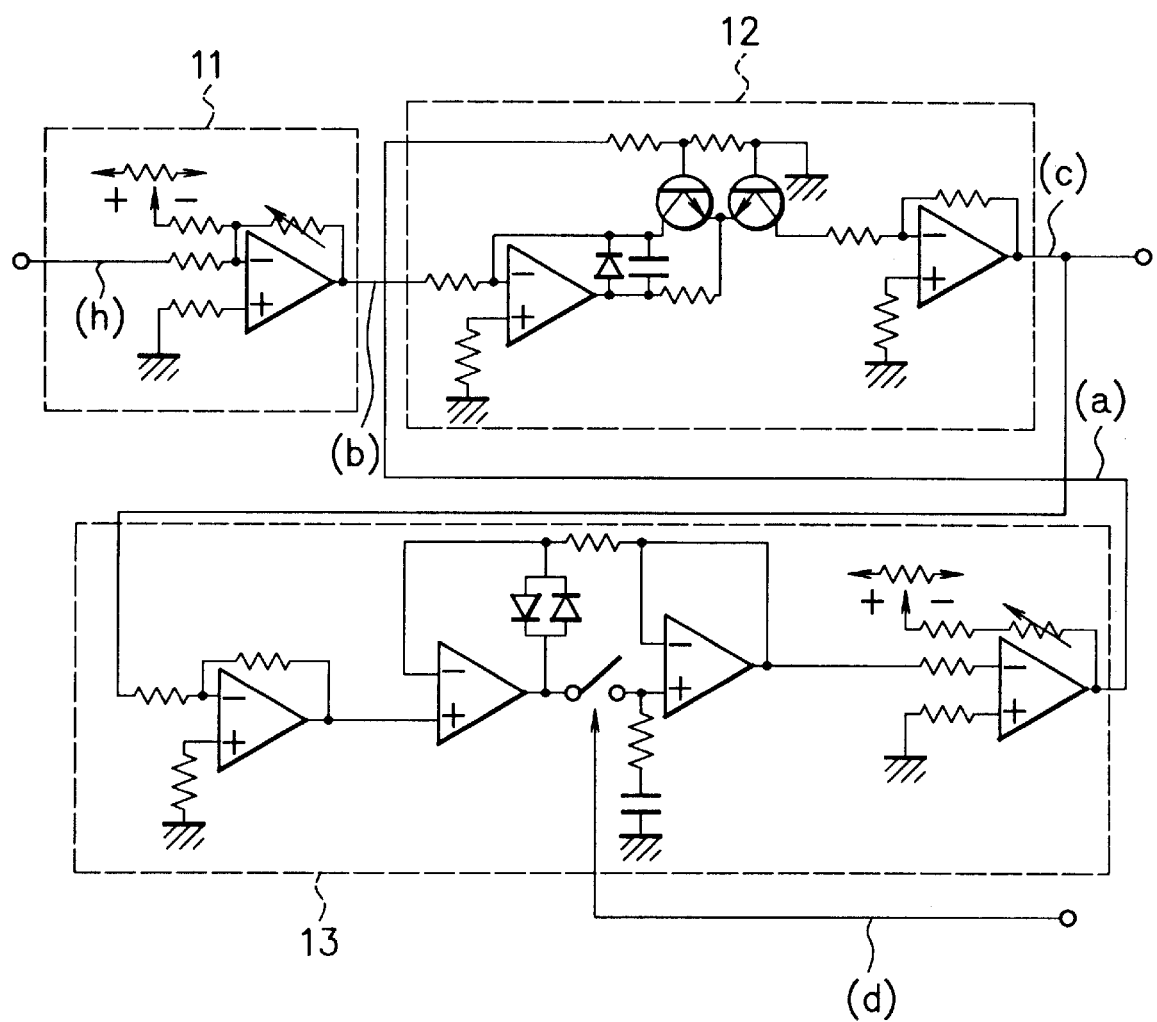
FIG. 3 is a schematic circuit diagram of the flicker reducing circuit embodiment of FIG. 2.

One example of the amplification factor control circuit 12 and peripheral circuit thereof among the flicker reducing circuit is shown more concretely in FIG. 3. The signal (h) from the linear image sensor is inputted to the preprocessing circuit 11 according to an inverting operational amplifier so that an offset and a gain are adjusted. The output signal (b) of the preprocessing circuit 11 is inputted to the amplification factor control circuit 12. The amplification factor control circuit 12 is the circuit for controlling an amplification factor of the preprocessing output (c) with the feedback signal (a) as a control signal and also with the preprocessing output (b) as an input signal while applying an antilog amplifier.

A part of the output-after-correction signal (c) from the amplification factor control circuit 12 is inputted to the sample and hold circuit 13, simultaneously which comes into an output signal to an A/D conversion circuit 9. In the sample and hold circuit 13, the part of the output-after-correction signal (c) is inputted to a buffer amplifier for sample/hold after inverting the signal to apply negative feedback, and it causes the operation of a sampling and a holding to be executed while making and breaking an analog switch within the circuit by means of the sample hold control signal (d). The part of the output-after-correction signal (c) is inputted to the operation amplifier for adjusting an inverting amplification and an offset which prescribe a gain of a negative feedback passed through the buffer amplifier at an exit point, then a feedback signal (a) being an output signal thereof is inputted thereto by way of a control signal of the amplification factor control circuit 12. Consequently, during the sample period, since the analog switch of the sample and hold circuit 13 is in a closed state, a negative feedback circuit for controlling amplification factor is constituted. During the hold period, the amplification factor control circuit 12 operates under the state where the value of the control signal set during sample the period is held.

With respect to timing of sample/hold, the timing thereof is synchronized with a clock which drives the linear image sensor. Mainly two kinds of clock signal are outputted from the linear image sensor drive circuit 10, one is a shift clock (f) for transferring electric charge accumulated in respective pixels arranged in one-dimension, and the other is a transfer gate clock (e) for controlling electric charge of whole pixels all at once. In some cases, a clock for performing sample and hold for a signal to respective pixels or a clock for performing reset for an electric charge is inputted to the amplification factor control circuit 12 by way of another drive signal group (g).

In general, the shift clock (f) corresponds to respective pixels, a cycle of the transfer clock (e) is established at a longer period than the time period represented by the cycle of the shift clock (f) multiplied by number of pixels. The cycle is established such that an image corresponding to one line of the image sensor falls within pulses of the transfer clock (e). A cycle of sample and hold timing inputted to the sample hold circuit 13 is synchronized with the transfer clock (e), which is subjected to photoelectric conversion at the reference light receiving region 15. Thus, in the sample and hold circuit 13, the time period when the cycle is outputted by way of electric signal is established to the sample period, while the time period when the cycle is not outputted is established to the hold period.

An image signal which is processed during sample period is the signal which is subjected to photoelectric conversion by pixel existing in the reference light receiving region 15. As described above, during the sample period when the flicker reducing circuit implements a negative feedback operation, the image signal with flicker is inputted to the sample and hold circuit passed through the amplification factor control circuit, before being inputted to the amplification circuit by way of the control signal again. However a control signal value of amplification factor is prescribed by way of a negative feedback amount such that the amplification factor control circuit causes an amplification factor of the image signal to lower, when the image signal is larger than the threshold value because of addition of the flicker component, while when the image signal is smaller than the threshold value, a control signal value of amplification factor is prescribed such that the amplification factor control circuit causes an amplification factor of the image signal to enlarge.

The negative feedback amount of the reference region is prescribed, before the sample and hold circuit enters into a hold period. The image signal is processed due to a fixed amplification factor because during the hold period, the control signal of the amplification factor is unchanged. The image signal with the exception of the reference region is read while being processed due to the settled amplification factor by way of the image. This operation is the operation which is implemented in every one line of the linear image sensor. Consequently, the output signal during sample period corresponding to a certain reference region at start of one line converges upon a settled identical level regardless of any line. On the other hand, the signal corresponding to manuscript region in the hold period is outputted by way of the signal in answer to lightness of the manuscript image with the signal of the reference region as a reference value.

Now, a value of the image signal obtained from the reference region being flashed on the manuscript surface is settled in accordance with irradiated light to the reference region identical with the manuscript image surface as well as light-and-shade of the reference region, namely in accordance with degree of reflection of the irradiated light. In the case of the indirect type image scanner according to the present invention, light is irradiated by natural light entered from windows, ceiling lamp such as fluorescent lamp, or auxiliary light source provided for the purpose of irradiating a manuscript surface mainly. In the light source which is used without rectifying of lamp line alternating current cycle (under normal condition 50 Hz to 60 Hz) provided from an electric power company in terms of the ceiling lamp and the auxiliary light source repeat the flash with a cycle of two times to four times. For this reason, a human can see by way of constant lighting, however when the quantity of light is measured practically, shade period of light-and-shade is 40 with peak value of lightness as 100.

Now, supposing that only when the ceiling lamp without rectifying of alternating current of the lamp line causes both of the manuscript image of the manuscript surface and the reference region to be irradiated. As described above, degree of light-and-shade is set in such a way that shade period of light-and-shade is 40 peak value of lightness as 100. At this time, the reference region reflects 80%, assuming that the image is imaged in the linear image sensor, (the image is taken as gray-80-image), the flicker causes lightness irradiated to the reference light receiving region to change in answer to light-and-shade of the ceiling light from lightness of reflection of 80% to lightness of 32%. Further, with respect to a part of the manuscript image instead of the reference region, patterns and characters with various reflection factors are figured in the manuscript image surface. By way of the example, gray image with the reflection factor of 50% (the image is taken as gray-50-image) is taken. The sub-image is read by the linear image sensor while changing lightness from 50% to 20% due to the flicker of the ceiling lamp.

In the flicker correction circuit, an amplification factor of the image signal is held to 100/40 times (namely 2.5 times) the inputted one line during the darkest period of the flicker by the control signal which is sampled at the reference region, while an amplification factor of the image signal is held to 100/100 times (namely 1 time) the inputted one line during the brightest period. The amplification factor is held each time in every line in between one time to 2.5 times to the different period of the flicker.

Supposing that the former gray-50-image is read during the darkest period of the flicker. The amplification factor is corrected to 50% because in the flicker correction circuit of lightness of 20% is corrected into 2.5 times amplification factor due to the fact that amplification factor is corrected with conversion of the reflection factor so that the amplification factor becomes the value identical with that which is inputted to the linear image sensor during the brightest period of the flicker. Further, supposing that the gray-80-image is read during the darkest period of the flicker. The amplification factor is corrected to 80% because in the flicker correction circuit of lightness of 32% is corrected into 2.5 times. Thus light-and-shade of the manuscript image due to the flicker is corrected in such a way that correction is implemented due to amplification factor which is prescribed during sample the period to be held.

In a second embodiment shown in FIG. 5, in front of the linear image sensor, namely in front of the reference light receiving region 15, a diffusion plate 16 is provided. In the constitution of the first embodiment, in some cases when a paper with light-and-shade or writing materials are put on the reference region 14 on the manuscript surface, an amplification factor is incapable of being maintained at a prescribed level in every line because the amplification factor changes based on light-and-shade of the reference region 14, with the result that in some cases it causes a bad influence to occur in terms of the signal of the manuscript image. In order to cope with the matter, the second embodiment of the present invention, there is provided a diffusion plate 16 for the reference light receiving region 15 in front of the linear image sensor 3, so that it causes an amplification factor control signal which is not influenced by small light-and-shade of the reference region 14 to be generated.

The diffusion plate 16 provided in front of the linear image sensor 3 causes the image to diffuse during the sample period, which image is imaged in front of the linear image sensor of the pixels and which is subjected to signal processing during the sample period so that the diffusion plate 16 plays dim role in a light-and-shade images such as a small light-and-shade image of the characters or a pen put on the reference region 14 by mistake. Namely, the diffusion plate 16 reduces sudden change of light-and-shade of the image as it emerges of the reference region 14 to pass mainly light-and-shade which change with the time proceeding such a flicker to the linear image sensor 3. A large degree of diffusion is desirable for the diffusion plate. However, there is a limit because in some of the diffusion plates, transmitted light comes to be dark.

Figure 6:
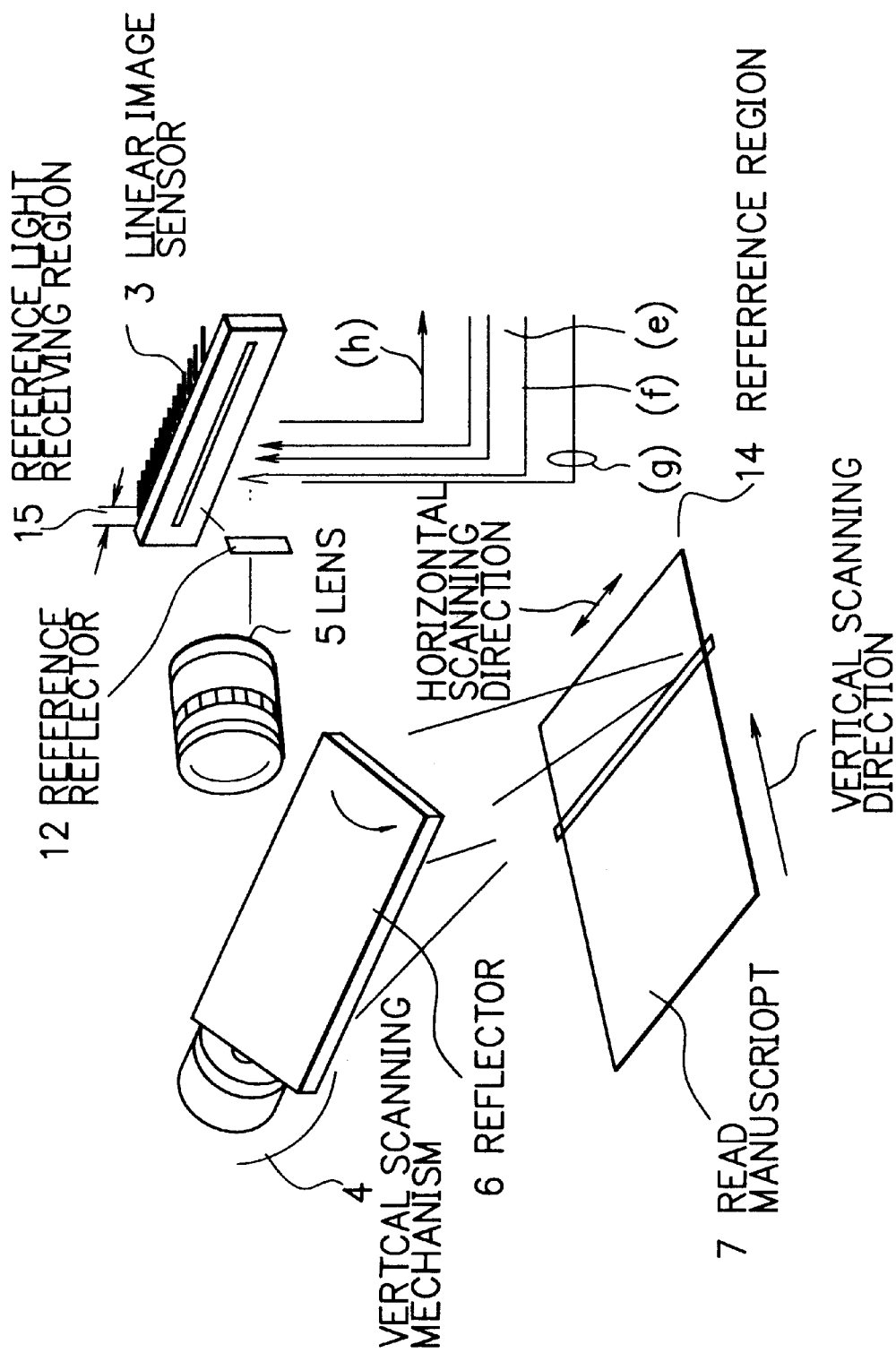
FIG. 6 is a perspective view showing a third embodiment of an image apparatus of the present invention.

In the first and the second embodiments, the reference region for sampling the fluctuation component of flicker in the sample and hold circuit utilizes a part of the image which is imaged at the reference light receiving region 15 in front of the linear image sensor, so that the reference region 14 is established at the biased specific place such as the left end or the right end of the manuscript surface. FIG. 6 is a configuration example of a third embodiment. As shown in FIG. 6, the invention is capable of taking a signal for removing flicker without limiting the reference region to the left end or the right end of manuscript surface, by providing a small reference reflector 19 at least a part of a front of the light receiving surface of the linear image sensor 3.

For example, the image existing at the center of the horizontal scanning direction of the manuscript surface comes to be imaged approximately at the center of the linear image sensor. However, as shown in FIG. 7, there is mounted a small reference reflector 19 about halfway between the linear image sensor 3 and the lens 5, namely, in a center position of the linear image sensor. A part of the image which is condensed from the lens 5 for projection upon the center of the linear image sensor light receiving surface is projected on an element which exists at the reference light receiving region 15 and outputted for flicker correction. The light receiving element existing in the reference light receiving region 15 is capable of taking a signal for flicker correction from the image of the central portion by providing the reference reflector 19 even if the light receiving element of the reference light receiving region 15 utilizes a part of the end of the linear image sensor, with the result that it is capable of implementing optimum flicker correction at necessary positions of the manuscript image.

Further, it is unnecessary to restrict the invention to one reference reflector. A plurality of reference reflectors may be provided to be dispersed in between the linear image sensor and the lens to generate flicker information not only central of the image but also on the various manuscript surfaces to mix signals for correction, thus delicate flicker correction becomes possible.

Figure 8:
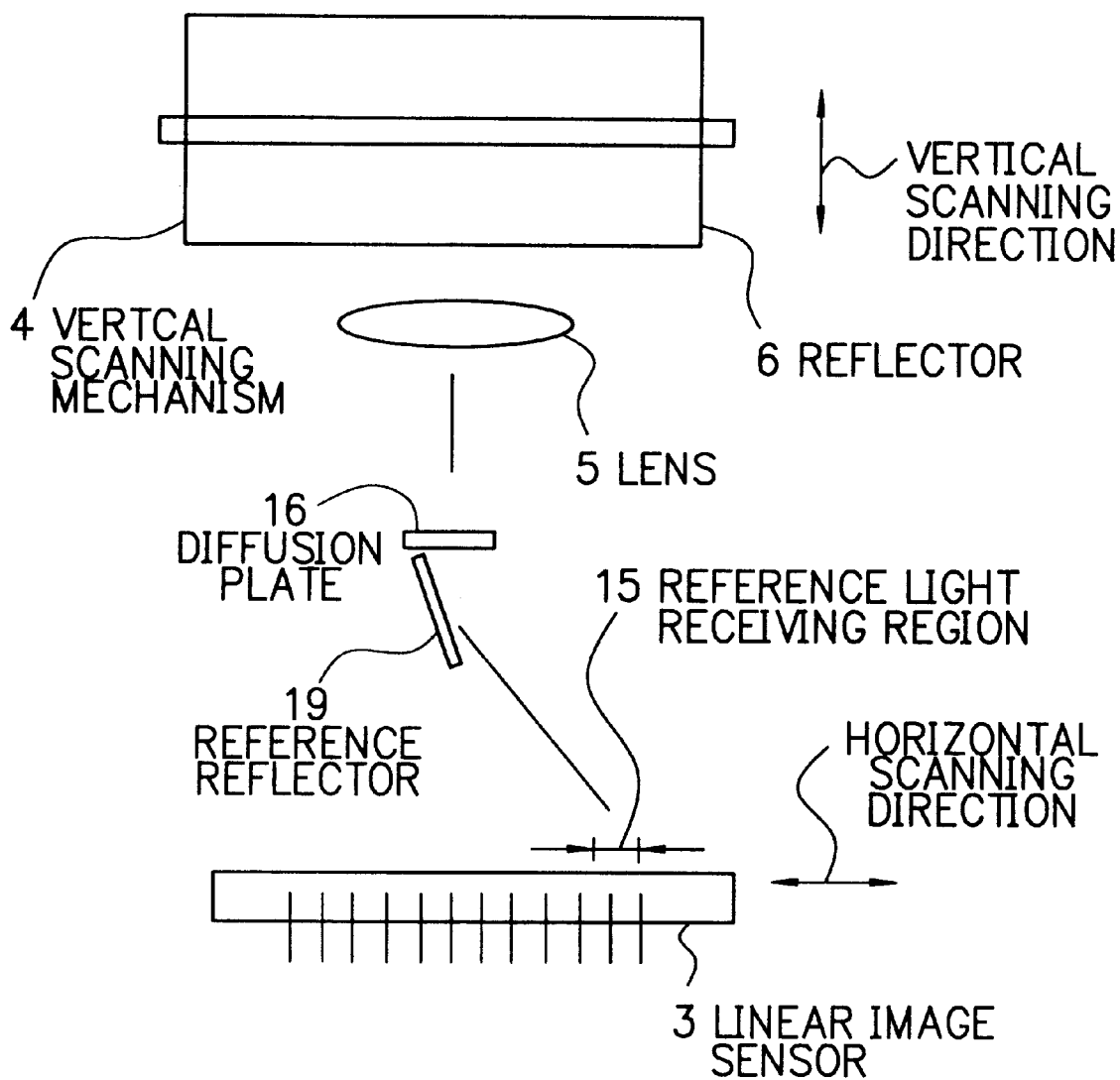
FIG. 8 is a diagram showing a fourth embodiment of an image read apparatus of the present invention.

FIG. 8 is a configuration example of a fourth embodiment. In the configuration example of the fourth embodiment, there is provided a diffusion plate 16 in front of the reference reflector 19 on the way of light path from the manuscript surface to the linear image sensor in addition to the reference reflector 19 of the third embodiment. The reference reflector 19 reflects a part of the manuscript image which is projected on a part of light receiving surface of the linear image sensor by way of image for flicker correction. However, when a light-and-shade image exists in the manuscript image projected on the reference reflector 19, errors may occur in flicker correction as shown in the second embodiment in some cases. In order to avoid this, there is provided the diffusion plate 16 on the light path from the manuscript surface to the reference light receiving region 15, thus making the manuscript shade off, prevention the flicker correction value from being influenced by a local light-and-shade of the manuscript surface. Further, there is provided the diffusion plate 16 in front of the reference reflector 19, however, it is also suitable to provide the diffusion plate 16 on the light path from the reference reflector 19 to the reference light receiving region of the linear image sensor.

Figure 9:
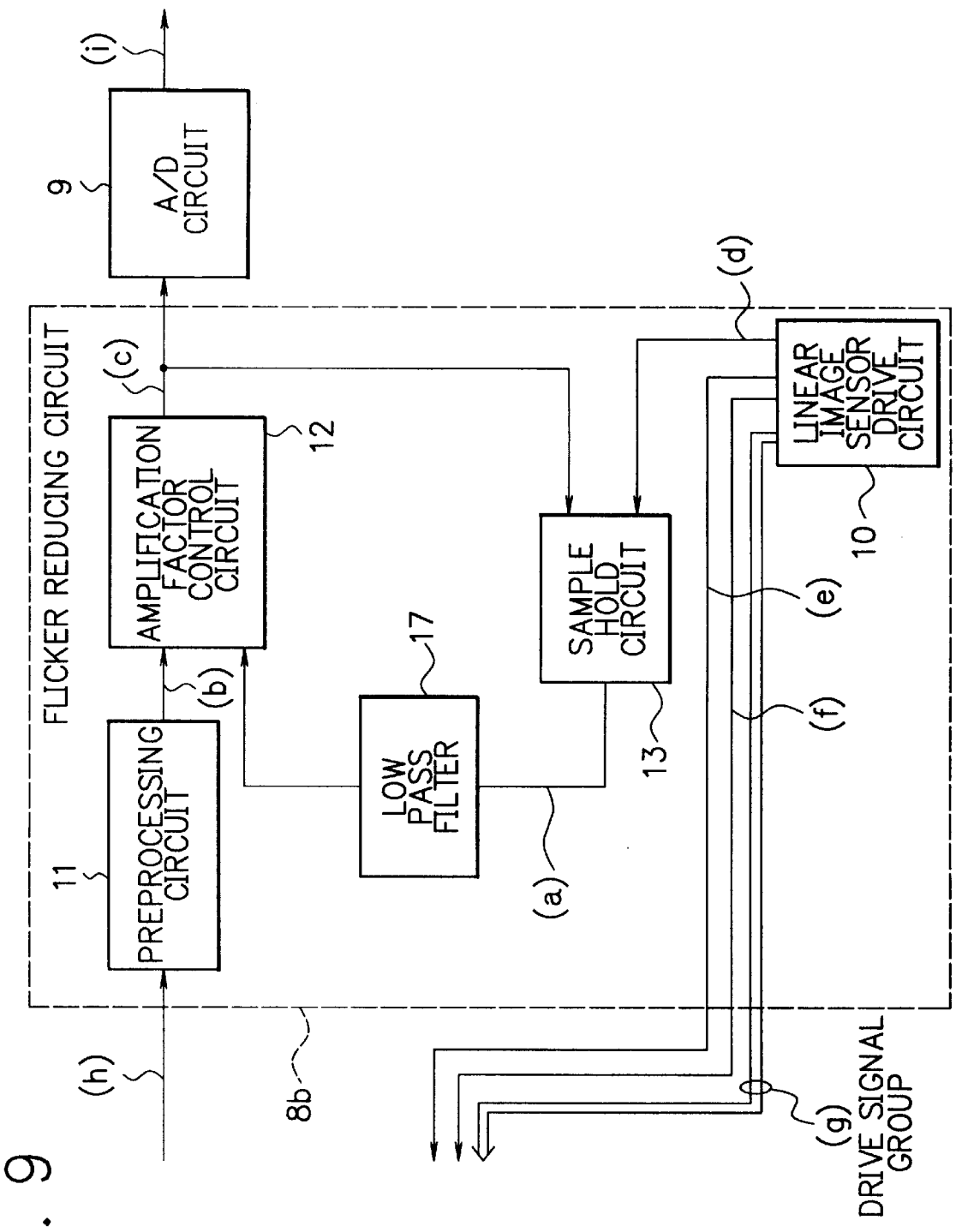
FIG. 9 is a block diagram showing a fifth embodiment of an image read apparatus of the present invention.

FIG. 9 shows a configuration example of a fifth embodiment. In the fifth embodiment, there is provided a low pass filter in between the sample and hold circuit 13 described in the first embodiment and the amplification factor control circuit 12 so that a flicker reducing circuit 8b is constituted. Thus even if light-and-shade image exists in the reference region for correcting flicker, the embodiment is capable of reducing bad influence to the manuscript image signal. By way of a time constant of the low pass filter 17, since it causes at least flicker component to pass, it is necessary to set a cut-off frequency to the point of more than 100 Hz.

By inserting such low pass filter 17, although when the light-and-shade image caused by the image is mixed to the reference region of the flicker correction, if the frequency component due to light-and-shade of the image is more than the frequency of the flicker signal, it does not come to be a subject of the correction. For this reason, it is capable of reducing erroneous correction. In FIG. 9, there is provided the low pass filter in between the sample hold circuit and the amplification factor control circuit. However, even if there is provided the low pass filter in between the sample and hold circuit and the signal-after-correction (c), the same effect as that of the above arrangement may be obtained.

Figure 10:
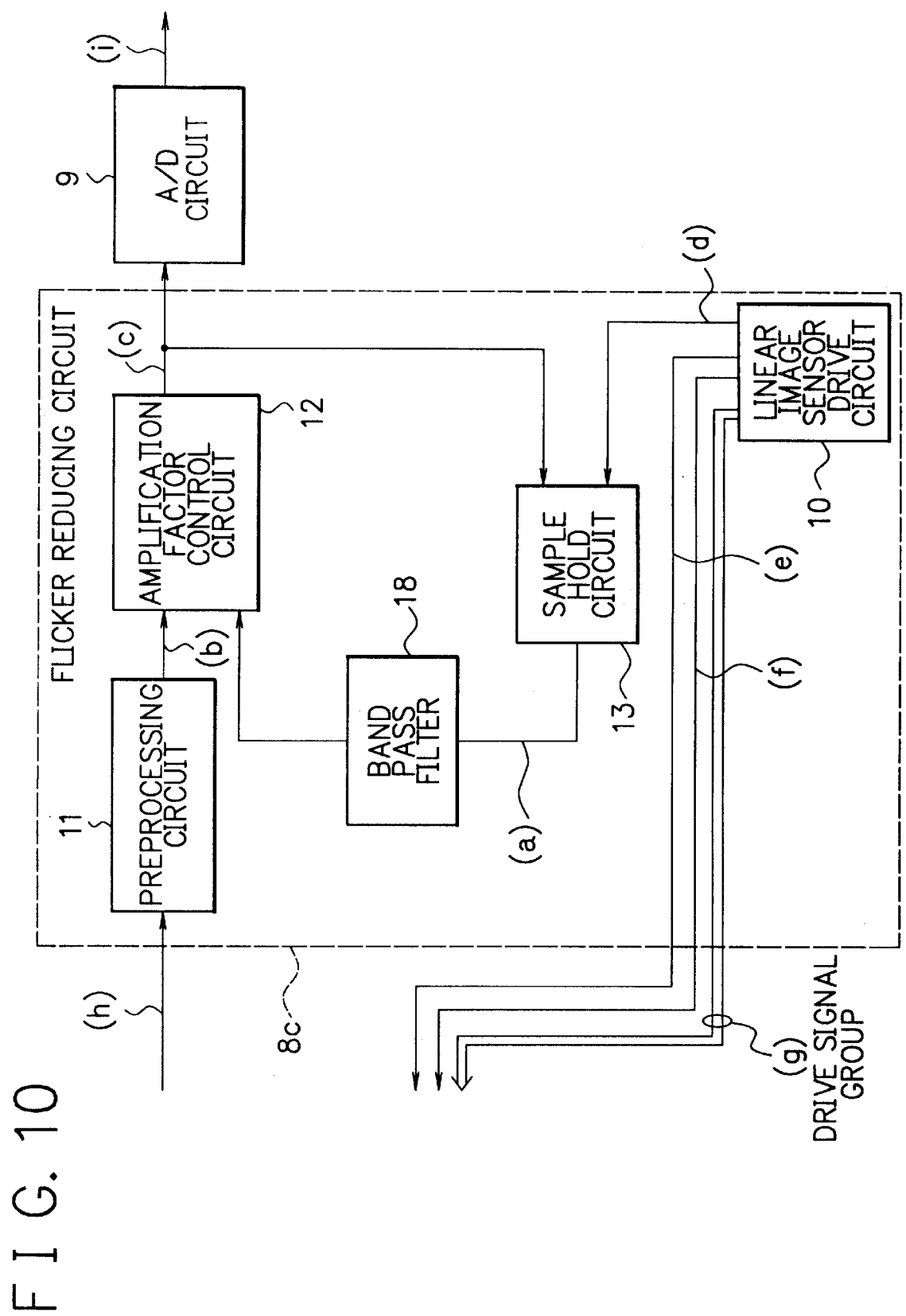
FIG. 10 is a block diagram showing a sixth embodiment of an image read apparatus of the present invention.

FIG. 10 shows a configuration example of a sixth embodiment. In the sixth embodiment, a flicker reducing circuit 8c is constituted by providing a band pass filter 18 instead of a low pass filter described in the fifth embodiment. In accordance with the constitution, the sixth embodiment becomes capable of reducing bad influence to the manuscript image signal, even if the manuscript image in which light-and-shade exists in larger extend is put on the reference region for correction flicker in comparison with a stripe line interval generated due to flicker. By way of time constant of the band pass filter 18, since it causes at least flicker component to pass, it is necessary to set a passing-band to 100 Hz to 200 Hz.

By inserting such band pass filter 18, when the light-and-shade image due to the image is mixed in the reference region for correcting flicker, although the mixed image has the large light-and-shade, or the fine light-and-shade, it does not come to be a subject of the correction, thus it is capable of reducing erroneous flicker correction. In FIG. 10, there is provided the band pass filter in between the sample and hold circuit and the amplification factor control circuit. However, even if there is provided the low pass filter in between the sample and hold circuit and the signal-after-correction (c), the same effect as that of the above arrangement may be obtained.

According to the above-described embodiment, the image read apparatus uses the linear image sensor by way of means for converting the image data into an electric signal, and converts one dimensional image data into two-dimensional image data by combining the lens for imaging the read-image with the vertical scanning mechanism for inputting sub-image in required direction successively. In the present configuration, the image read apparatus comprises the sample and hold circuit for taking a part of the image signal outputted from the linear image sensor, and the amplification factor control circuit for changing amplification factor which amplifies (or attenuates) an output signal of the linear image sensor in answer to a negative feedback input signal outputted from the sample and hold circuit.

Further in the present embodiments, there is provided the diffusion plate in front of the part of the linear image sensor light receiving surface, and there is provided the reference reflector for reflecting light from the manuscript image.

Furthermore, in addition to the reference reflector there is provided the diffusion plate at least at a part in front of the light receiving surface of the linear image sensor.

Moreover, there is provided the low pass filter or the band pass filter in between the sample and hold circuit and the amplification factor control circuit.

As described above, the image read apparatus according to the present invention converts the light from the image into the image signal by means of the linear image sensor, before taking a part of the converted image signal, thus changing the amplification factor which is amplified or is attenuated in answer to the negative feedback input signal outputted from the sample and hold circuit. According to the change, since the constitution is that it causes the amplification factor of the image signal to be subjected to the negative feedback based upon a part of the image signal from the linear image sensor, it is capable of implementing correction without reference to exposed time of the linear image sensor, when removing bad influence which affects image signal caused by the light-and-shade change of the frequency corresponding to the lamp line. Consequently, there is the effect in regard to high speed reading, and it is capable of achieving optimization of correction amount in comparison with the case where a signal from another optical sensor is utilized for correcting flicker. Further, since the circuit for establishing the amplification factor due to the negative feedback on behalf of correction using addition is combined, it causes adjustment to the manuscript to lessen with half tone density, thus enabling precise correction, with the result that there is the effect of picture quality improvement.

Furthermore, since there is used the diffusion plate, the low pass filter, or the band pass filter, even when the light-and-shade image exists in the manuscript region for correction, the invention is capable of reducing erroneous correction, thus there is the effect of the picture quality improvement. Moreover, since there is provided the correcting reflector in the light path in between the manuscript image and the linear image sensor, the manuscript region for correction is not restricted to the end section, thus there is the effect that picture quality improves due to optimization of correction.

Moreover, when the linear image sensor is in use therefore, the apparatus has simple constitution in comparison with a image read apparatus with semi-multi sensor. It is capable of obtaining high resolution image whose flicker is removed at a relatively low price in comparison with the apparatus which uses a two-dimensional image sensor.

While preferred embodiments, of the invention have been described using specific terms, such description is for illustrative purpose only, and it is to be understood that changes and variations may be made without departing from the spirit or scope of the following claims.

What is claimed is:

1. An image read apparatus comprising:
   a linear image sensor for converting light from an image into an image signal which is an electric signal, said image comprising a plurality of sub-images;
   a lens for focusing said light from the image;
   a vertical scanning mechanism for inputting said light from each sub-image of said image to said linear image sensor successively;
   a sample and hold circuit for sampling said image signal outputted from said linear image sensor to generate and output a negative feedback control signal; an amplification factor control circuit for changing an amplification factor which one of: amplifies and attenuates each said image signal in answer to the negative feedback control signal outputted from said sample and hold circuit, wherein the image read apparatus causes a two-dimensional image signal, whose light component other than said image is removed, to be read due to a change of said amplification factor thereby correcting the image; and
   a filter for correcting flicker in between said sample and hold circuit and said amplification factor control circuit.

2. The image read apparatus as set forth in claim 1, wherein there is provided at least one of: a diffusion plate and a reflector for reference at least partly in front of a light receiving surface of said linear image sensor.

3. The image read apparatus as set forth in claim 1, wherein said filter is one of: a low pass filter and a band pass filter.

4. A reading method of an image read apparatus comprising the steps of:
   converting light from an image into an image signal which is an electric signal by means of a linear image sensor, said image comprising a plurality of sub-images;

focusing said light from the image by means of a lens;

inputting said light from each sub-image of said image to said linear image sensor successively by means of a vertical scanning mechanism;

sampling part of each image signal outputted from said linear image sensor by means of a sample and hold circuit to generate and output a negative feedback control signal;

changing an amplification factor which one of: amplifies and attenuates said image signal in answer to the negative feedback signal outputted from said sample and hold circuit by means of an amplification factor control circuit, wherein the image read apparatus causes a two-dimensional image signal, whose light component other than said image is removed, to be read due to a change of said amplification factor thereby correcting the image; and providing a filter for correcting flicker in between said sample and hold circuit and said amplification factor control circuit.

* * * * *